(12) United States Patent
Horie et al.

(10) Patent No.: US 6,804,413 B1
(45) Date of Patent: Oct. 12, 2004

(54) IMAGE PROCESSING DEVICE AND METHOD FOR COMBINING IMAGES OBTAINED FROM SEPARATE-PICKUP

(75) Inventors: Daisaku Horie, Uji (JP); Manji Takano, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 641 days.

(21) Appl. No.: 09/610,654

(22) Filed: Jul. 5, 2000

(30) Foreign Application Priority Data

Jul. 7, 1999 (JP) .......................... 11-192717

(51) Int. Cl.⁷ .............................. G06K 9/36; G06K 9/32
(52) U.S. Cl. ...................................... 382/284; 382/294
(58) Field of Search .............................. 382/154, 284, 382/294, 298; 348/47, 51

(56) References Cited

U.S. PATENT DOCUMENTS 5,602,584 A * 2/1997 Mitsutake et al. .......... 382/154
5,963,664 A * 10/1999 Kumar et al. ............... 382/154

FOREIGN PATENT DOCUMENTS

| JP | 7-264394 | 10/1995 |
| JP | 9-74522 | 3/1997 |
| JP | 9-322039 | 12/1997 |
| JP | 10-215411 | 8/1998 |

* cited by examiner

Primary Examiner—Leo Boudreau
Assistant Examiner—Duy M. Dang
(74) Attorney, Agent, or Firm—McDermott Will & Emery LLP

(57) ABSTRACT

An image processing device includes: a CCD to input a plurality of images obtained from a separate-pickup of an object performed such that parts of the images are overlapped; and an image combining section to combine two images adjacent to each other in one of a first manner and a second manner; wherein in the first manner, two images adjacent to each other in a first direction are combined based on overlapping regions of two images adjacent to each other in the first direction, and in the second manner, two images adjacent to each other in a second direction are combined based on overlapping regions of two images adjacent to each other in the second direction; and the image processing device further includes a CPU to control the image combining section according to a predetermined condition such that the image combining section performs the combining in one of the first manner and the second manner. Even when common feature points do not exist in the overlapping regions of two adjacent images, correct combining of two images is allowed.

10 Claims, 10 Drawing Sheets

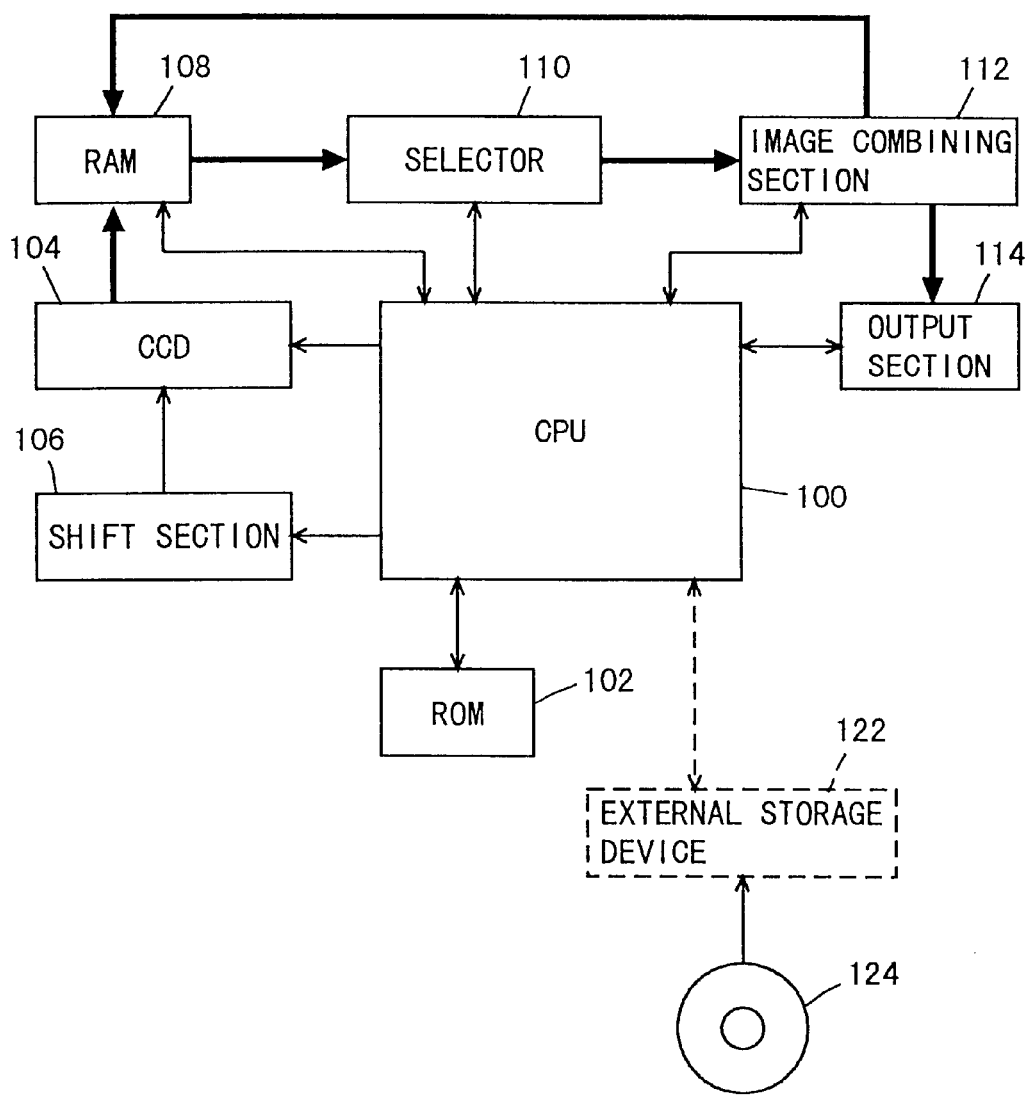
F I G. 1

F I G. 5
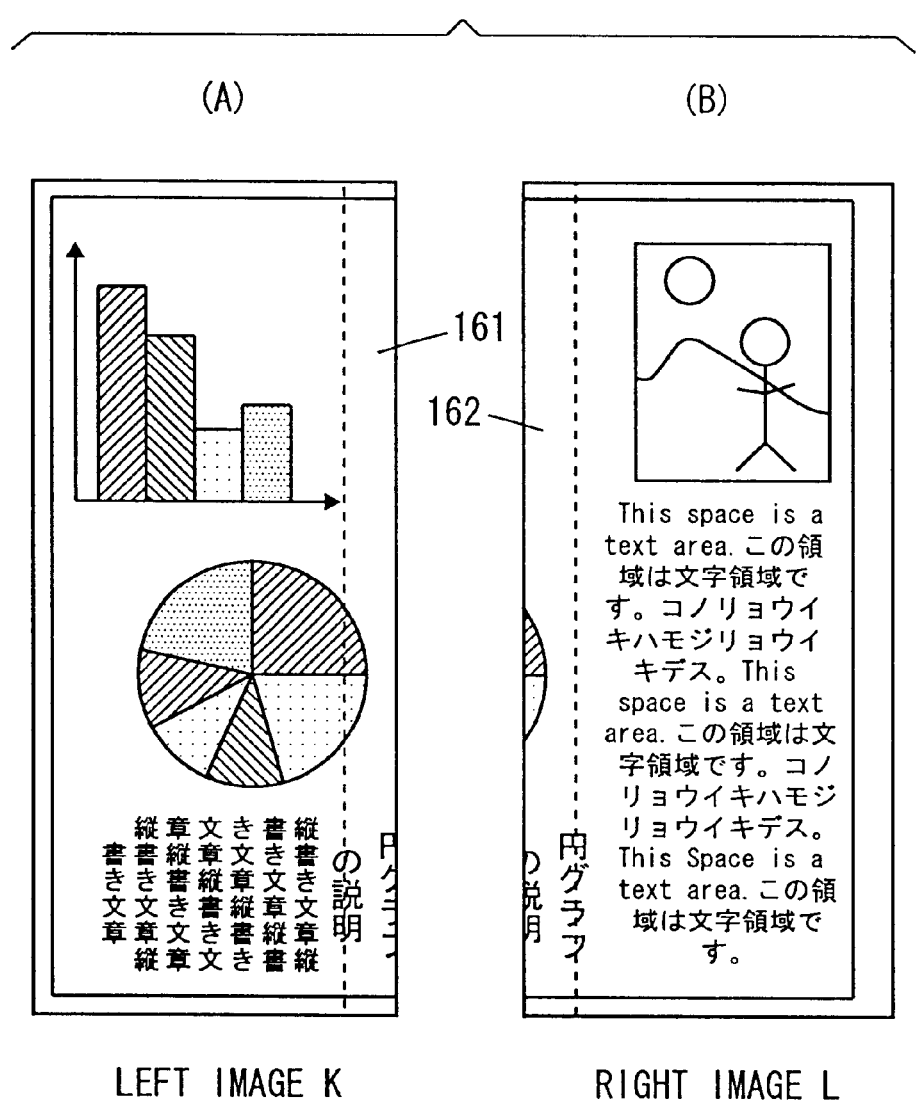
LEFT IMAGE K   RIGHT IMAGE L

IMAGE A (A)

UPPER IMAGE M (B)

LOWER IMAGE N (A)  (B)

IMAGE PROCESSING DEVICE AND METHOD FOR COMBINING IMAGES OBTAINED FROM SEPARATE-PICKUP

This application is based on Application No. 11-192717 filed in Japan, the content of which is hereby incorporated by reference.

BACKGROUND OF THE INVENTION

1. Field of the Invention

The present invention relates to image processing devices, image processing methods and computer program products, and more particularly to image processing devices, image processing methods and computer program products for combining images obtained from separate-pickup to form an image at a high resolution.

2. Description of the Related Art

Conventionally a technique has been known for combining a plurality of partial images obtained from separate-pickup of an object to form an image at a high resolution.

(1) In Japanese Patent Laying-Open No. 7-264394, an image processing device is disclosed in which, when a feature point is not included in a region where two partial images to be combined overlap, the region to be picked up as the partial images is illuminated with a marker and the partial images are combined, the marker included in the partial images is used as a reference.

(2) In Japanese Patent Laying-Open No. 9-74522, an image input and reproduction system is disclosed wherein partial images obtained through pickup by a plurality of pickup elements are combined based on relative position information of the plurality of pickup elements.

(3) In Japanese Patent Laying-Open No. 9-322039, a pickup device is disclosed wherein a plurality of images are picked up by a pickup element such that portions of the plurality of images overlap, corresponding points in the picked-up plurality of images are extracted, images arranged in a horizontal direction are combined as a line, and the resulting image is sequentially output to a printer.

(4) In Japanese Patent Laying-Open No. 10-215411, a digital X-ray pickup device is disclosed wherein boundary indexes for separate areas are provided in a frame in which a pickup area is displayed, partial image is picked up such that both an object and the boundary index are picked up and the partial images are combined such that the positions of boundary indexes in the partial images match with each other.

The conventional techniques as described above, however, have the following problems.

(1) The image reading device as disclosed in Japanese Patent Laying-Open No. 7-264394 tends to be expensive because an additional structure for directing a marker is required and a light with a strong intensity must be directed to show the marker on the images clearly.

(2) The image input and reproduction system, as disclosed in Japanese Patent Laying-Open No. 9-74522, has a limit in the accuracy of combining because the combining of the partial images is based on the relative position information from the plurality of pickup elements, and the accurate combining is not allowed.

(3) The pickup device as disclosed in Japanese Patent Laying-Open No. 9-322039 cannot align the partial images when the corresponding points do not exist in the overlapping regions of the partial images to be combined.

(4) In the digital X-ray pickup device as disclosed in Japanese Patent Laying-Open No. 10-215411, a large region, which is not originally necessary as the partial image, is included in the picked-up image and the ratio of the original in the partial image is low. This problem will be described further in detail below.

FIG. 11 shows a frame used in a conventional pickup device. In a frame 200, four boundary indexes 201 are provided and an original 202 is shown placed on the frame.

FIG. 12 shows an example of partial images obtained from separate-pickup by the conventional pickup device. In FIG. 12, (A) shows a partial image 210 of an upper left portion and (B) shows a partial image 211 of an upper right portion. As shown in (A) and (B) of FIG. 12, both partial images 210 and 211 include boundary indexes 201. Hence partial images 210 and 211 include a large portion besides the original and the ratio of the necessary original portion in the partial image becomes low.

SUMMARY OF THE INVENTION

The present invention is made to solve the above described problems and an object of the present invention is to provide image processing devices, image processing methods and computer program products allowing the accurate combining of two adjacent images even when a common feature point to two adjacent images do not exist in a region where two images overlap.

According to one aspect of the present invention, to achieve the object described above, an image processing device includes: an input section to input a plurality of images obtained from a separate-pickup of an object performed such that parts of the images are overlapped; and a combining section to combine two images adjacent to each other in one of a first manner and a second manner; in the first manner, two images adjacent to each other in a first direction are combined based on overlapping regions of two images adjacent to each other in the first direction, and in the second manner, two images adjacent to each other in a second direction are combined based on overlapping regions of two images adjacent to each other in the second direction; and the image processing device further includes a controller to control the combining section according to a predetermined condition such that the combining section performs the combining in one of the first manner and the second manner.

According to another aspect of the present invention, an image processing device includes: an input section to input an image obtained from a separate-pickup of an object; a combining section to combine two adjacent images; and a controller to control the combining section such that the two adjacent images input through the input section are combined based on overlapping regions of the adjacent images if possible, otherwise two adjacent images are combined based on another image input through the input section.

According to still another aspect of the present invention, an image processing method includes: a receiving step of receiving a plurality of images obtained from a separate-pickup of an object performed such that parts of the images are overlapped; a first combining step of combining two images adjacent to each other in a first direction based on overlapping regions of two images adjacent to each other in the first direction; and a second combining step of combining two images adjacent to each other in a second direction based on overlapping regions of two images adjacent to each other in the second direction; wherein the first combining step is performed first and then the second combining step is performed when the plurality of images can be combined at the first combining step whereas the second combining step is performed first and then the first combining step is performed when the plurality of images cannot be combined at the first combining step.

According to a further aspect of the present invention, an image processing method includes: a first receiving step of receiving a plurality of images obtained from a separate-pickup of an object performed such that parts of images are overlapped; a first combining step of combining two adjacent images based on overlapping regions of the two adjacent images; a second receiving step of receiving an image including a feature point common to the two adjacent images when the two adjacent images cannot be combined at the first combining step; and a second combining step of combining the two adjacent images based on the image received at the second receiving step.

According to still further aspect of the present invention, a computer program product causes a processor to perform: a receiving step of receiving a plurality of images obtained from a separate-pickup of an object performed such that parts of the images are overlapped; a first combining step of combining two images adjacent to each other in a first direction based on overlapping regions of two images adjacent to each other in the first direction; and a second combining step of combining two images adjacent to each other in a second direction based on overlapping regions of two images adjacent to each other in the second direction; wherein the first combining step is performed first and then the second combining step is performed when the plurality of images can be combined at the first combining step whereas the second combining step is performed first and then the first combining step is performed when the plurality of images cannot be combined at the first combining step.

According to still further aspect of the present invention, a computer program product causes a processor to perform: a first receiving step of receiving a plurality of images obtained from a separate-pickup of an object performed such that parts of images are overlapped; a first combining step of combining two adjacent images based on overlapping regions of the two adjacent images; a second receiving step of receiving an image including a feature point common to the two adjacent images when the two adjacent images cannot be combined at the first combining step; and a second combining step of combining the two adjacent images based on the image received at the second receiving step.

According to still further aspect of the present invention, an image processing method of combining at least three images includes the steps of: determining whether a first image and a second image can be combined based on an overlapping region or not, the overlapping region being a region in which the first and second images overlap; deciding whether to first combine the first image and the second image or to first combine the second image and a third image based on a result of determination; and combining images based on the decision.

According to still further aspect of the present invention, a computer program product employed to combine at least three images, causes a processor to perform the steps of: determining whether a first image and a second image can be combined based on an overlapping region or not, the overlapping region being a region in which the first and second images overlap; deciding whether to first combine the first image and the second image or to first combine the second image and a third image based on a result of determination; and combining images based on the decision.

According to still further aspect of the present invention, an image processing method of combining at least three images includes the steps of:

determining whether two images can be combined with each other based on an overlapping region, the overlapping region is a region in which the two images overlap with each other; deciding an order of combining based on a result of determination; and combining images based on a decided order.

According to still further aspect of the present invention, a computer program product employed to combine at least three images, causes a processor to perform the steps of: determining whether two images can be combined with each other based on an overlapping region, the overlapping region being a region in which the two images overlap with each other; deciding an order of combining based on a result of determination; and combining images based on a decided order.

According to the present invention, image processing devices, image processing methods and computer program products allowing the accurate combining of two images even when a common feature point does not exist in a region where two adjacent images overlap can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a circuit structure of a digital camera according to the embodiment of the present invention;

FIG. 5 shows a left image K obtained by combining of an upper left partial image P and a lower left partial image R and a right image L obtained by combining of an upper right partial image Q and a lower right partial image S;

DESCRIPTION OF THE PREFERRED EMBODIMENT

Figure 2:
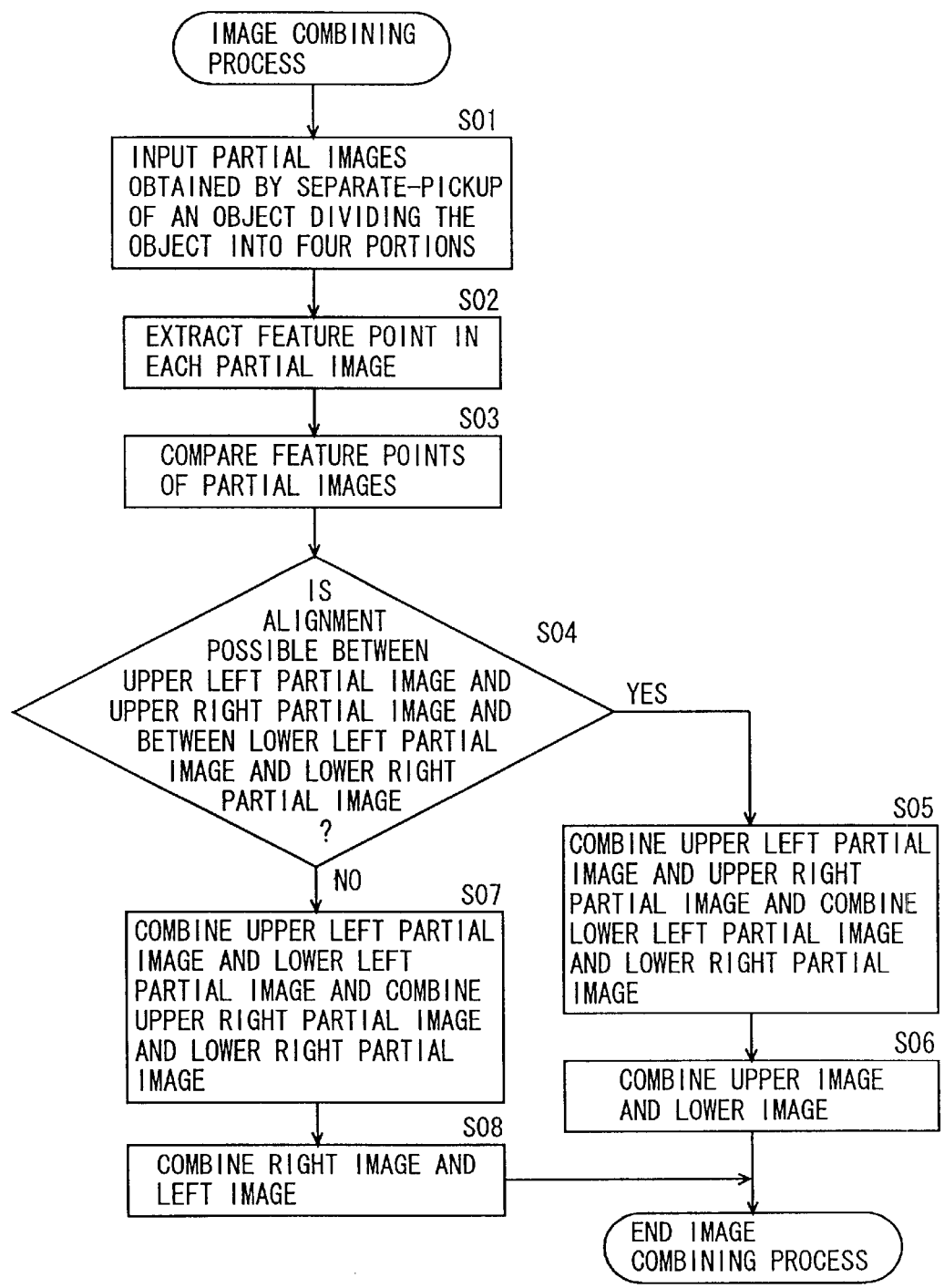
FIG. 2 is a flow chart showing a process flow of an image combining process performed in a digital camera according to the embodiment of the present invention.

The preferred embodiment of the present invention will be described below with reference to the drawings. In the drawings, the same character denotes same or a corresponding part.

A digital camera will be described below as an example of an image processing device of the embodiment of the present invention. FIG. 1 is a block diagram showing a circuit structure of a digital camera. With reference to FIG. 1, a digital camera includes a CPU (Central Processing Unit) 100 performing an overall control of the digital camera, a CCD (Charge Coupled Device) 104 performing an image pickup, a shift section 106 for shifting a pickup position of CCD 104, an RAM (Random Access Memory) 108 for temporarily storing an image from CCD 104, a selector 110 for selecting two images from a plurality of images stored in RAM 108, an image combining section 112 for combining two selected images, an output section 114 for outputting the combined image and an ROM (Read Only Memory) 102 for storing a program to be performed in CPU 100.

Here, CPU 100 of the digital camera may be connected with an external storage device 122 such that a program for the control of the digital camera can be read from a CD-ROM (Compact Disc Read Only Memory) 124, an magneto-optic disc or the like.

The digital camera according to this embodiment performs a separate-pickup of an original, combines a plurality of partial images obtained from the pickup and outputs a resulting image. For the simplicity of the description, a digital camera in which four divided partial images of the object are obtained at the pickup will be described.

According to an instruction from CPU 100, CCD 104 starts integration and performs dump of CCD data to RAM 108 after the completion of the integration. Thus, one partial image is stored in RAM 108.

According to an instruction from CPU 100, shift section 106 moves CCD 104 to shift the pickup position and enables the pickup of partial image by CCD 104. When the pickup is performed by the digital camera such that four divided partial images are obtained, the original is divided into an upper left portion, an upper right portion, a lower left portion and a lower right portion. Therefore, the position of the CCD is shifted by shift section 106 such that one of four divided portions of the original is placed in the pickup area of CCD 104. The position of the CCD is determined such that two adjacent partial images overlap. Here, the original instead of the CCD may be shifted.

By repeating the shifting of CCD 104 by shift section 106 and the pickup by CCD 104, an upper left partial image is obtained from the pickup of an upper left portion of the original, an upper right partial image is obtained from the pickup of an upper right portion of the original, a lower left partial image is obtained from the pickup of a lower left portion of the original and a lower right partial image is obtained from the pickup of a lower right portion of the original.

A right side part of the upper left partial image overlaps with a left side part of the upper right partial image and a lower side part of the upper left partial image overlaps with an upper side part of the lower left partial image. Similarly, a left side part of the lower right partial image overlaps with a right side part of the lower left partial image and an upper side part of the lower right partial image overlaps with a lower side part of the upper right partial image. The images in these overlapping areas are same in two partial images.

Selector 110 selects two of four partial images stored in RAM 108. The determination is made on whether a common feature point exists in the overlapping region of two adjacent partial images and two partial images having the common feature point are selected. The feature point can be found according to a known method which employs an edge detected by two-dimensional differential filter, a maximum and a minimum of a pixel value or the like. Further, a region with a specific feature can be used instead of the feature point.

Image combining section 112 combines two partial images selected by selector 110. After the matching of the feature points of respective partial images, the combining is performed based on thus detected displacement amount. An image obtained from the combining is output to RAM 108 or output section 114.

Output section 114 can be a display or a printer and supplies as an output the image obtained through the combining at image combining section 112. Output section 114 can be a hard disc, an external storage device, a terminal or the like.

Next, the image combining process performed in the digital camera will be described. In the image combining process according to the embodiment, when two horizontally adjacent partial images among four partial images obtained through separate-pickup have overlapping portions with a common feature point, two horizontally adjacent partial images are first combined followed by a vertical combining whereas when two horizontally adjacent partial images do not have overlapping portions with a common feature point, two vertically adjacent partial images are first combined followed by the horizontal combining.

FIG. 2 is a flow chart showing a process flow of the image combining process performed in the digital camera according to this embodiment. With reference to FIG. 2, in the image combining process, first, partial images obtained from a pickup of four separate portions, that is, upper left, lower left, upper right and lower right portions, of an object are input (S01).

Figure 3:
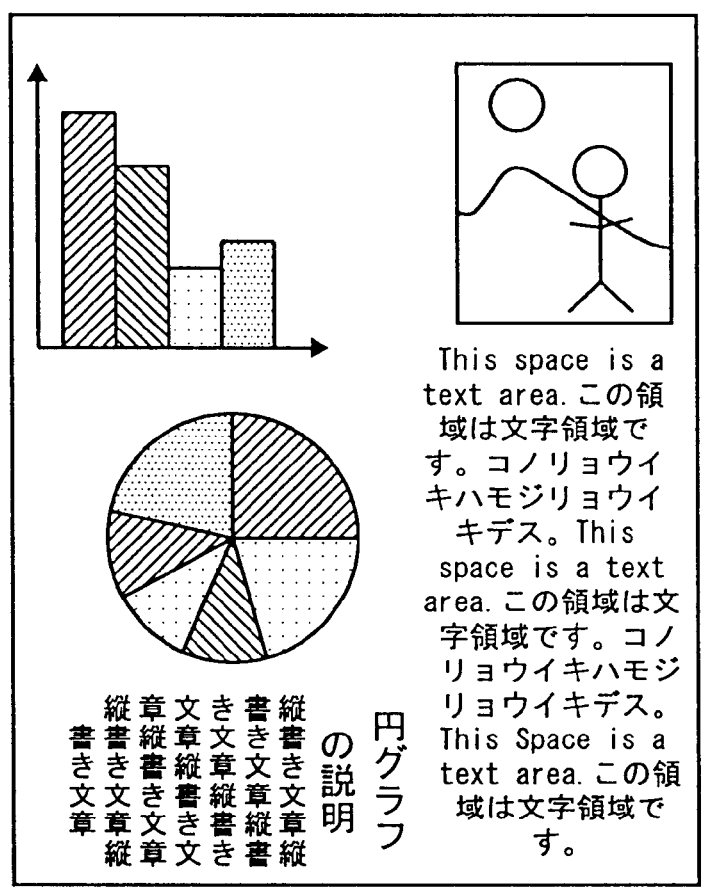
FIG. 3 shows an example of an original which is an object picked up by a digital camera.
Figure 4:
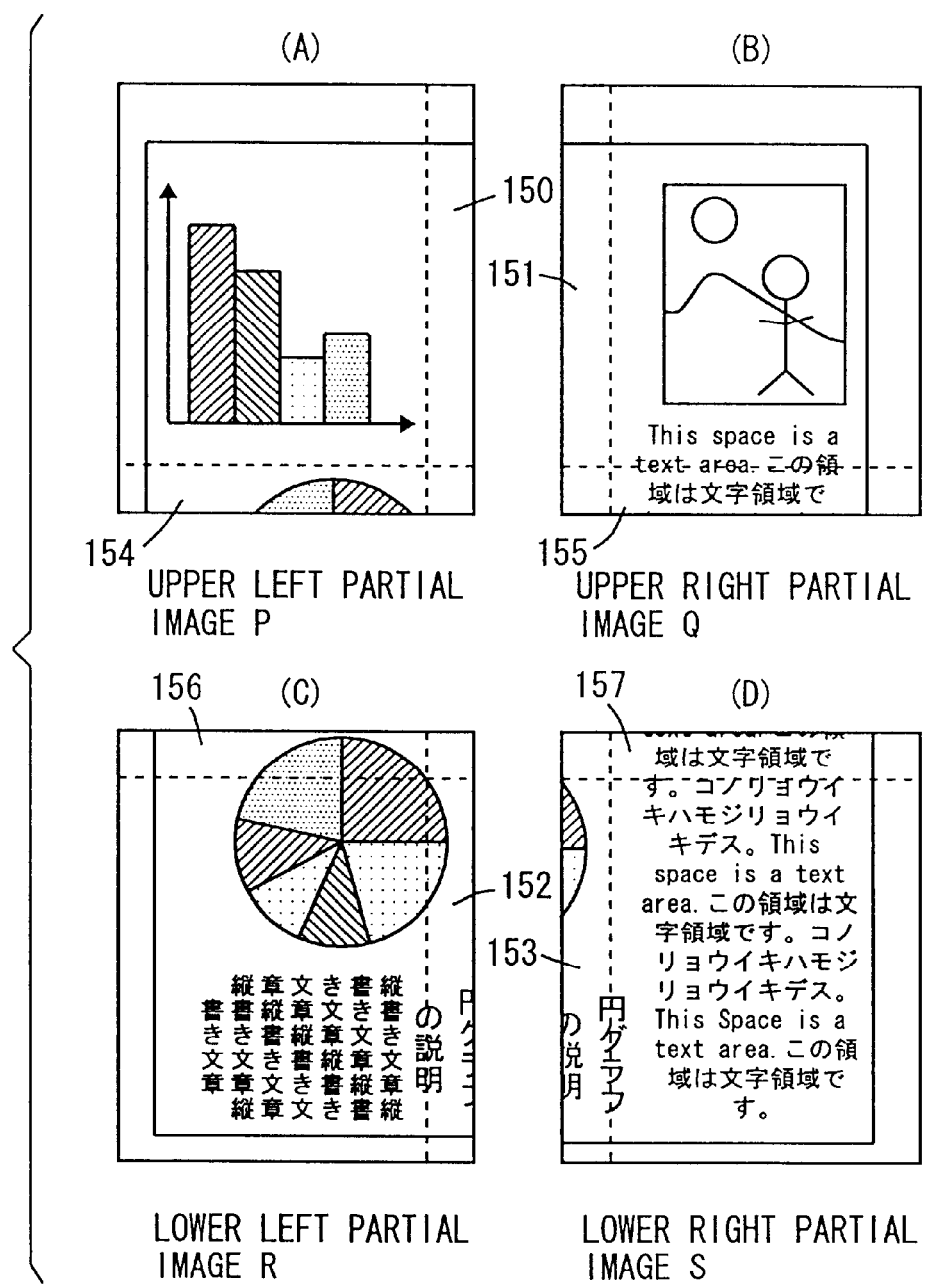
FIG. 4 shows partial images obtained by separately picking up an original shown in FIG. 3.

FIG. 3 shows an example of an original which is an object of the pickup by the digital camera. FIG. 4 shows partial images obtained from separate-pickup of the original with the digital camera. In FIG. 4, (A) shows an upper left partial image P obtained from pickup of an upper left portion of the original; (B) shows an upper right partial image Q obtained from pickup of an upper right portion of the original; (C) shows a lower left partial image R obtained from the pickup of a lower left portion of the original; and (D) shows a lower right partial image S obtained from the pickup of a lower right portion of the original. With reference to (A)~(D) of FIG. 4, an overlapping portion 150 of upper left partial image P overlaps with an overlapping portion 151 of upper right partial image Q and an overlapping portion 154 overlaps with an overlapping portion 156 of lower left partial image R. Similarly, an overlapping portion 153 of lower right partial image S overlaps with an overlapping portion 152 of lower left partial image R and an overlapping portion 157 overlaps with an overlapping portion 155 of upper right partial image Q.

Returning to FIG. 2, feature points are extracted from the resulting four partial images (S02). The feature points are extracted through the two-dimensional differential filtering on overlapping portions of respective partial images and detection of edges. Then, based on the extracted feature points, matching is performed to determine whether there is a common feature point between partial images (S03).

With reference to FIG. 4, for example, from overlapping portion 150 of upper left partial image P and overlapping portion 151 of upper right partial image Q, no feature point is extracted. Hence, upper left partial image P cannot be made aligned with upper right partial image Q. Conversely, in overlapping portion 154 of upper left partial image P and overlapping portion 156 of lower left partial image R, a common feature point exists and upper left partial image P can be aligned with lower left partial image R. Similarly, as a common feature point exists in overlapping portion 155 of upper right partial image Q and an overlapping portion 157 of lower right partial image S, alignment is allowed.

In the next step S04, it is determined whether the alignment between upper left partial image P and upper right partial image Q is possible or not and whether the alignment between the lower left partial image and the lower right partial image is possible or not. When both alignments are possible, the process proceeds to a step S05 and when either or both of alignments is not possible, the process goes to step S07. When the partial images as shown in FIG. 4 are input, for example, as the alignment is not possible between upper left partial image P and upper right partial image Q, the process goes to step S07.

At step S07, the combining of upper left partial image P and lower left partial image R and the combining of upper right partial image Q and lower right partial image S are performed. In the partial image combining, the displacement is detected based on the common feature point in the overlapping portions of two partial images, a transformation process such as horizontal shift, magnification/reduction, a rotation or the like is performed on one or both of the images based on the detected displacement information such that feature points overlap each other and then two partial images are combined.

FIG. 5 shows a left image K obtained from the combining of upper left partial image P and lower left partial image R shown in FIG. 4, and a right image L obtained from the combining of upper right partial image Q and lower right partial image S.

Figure 6:
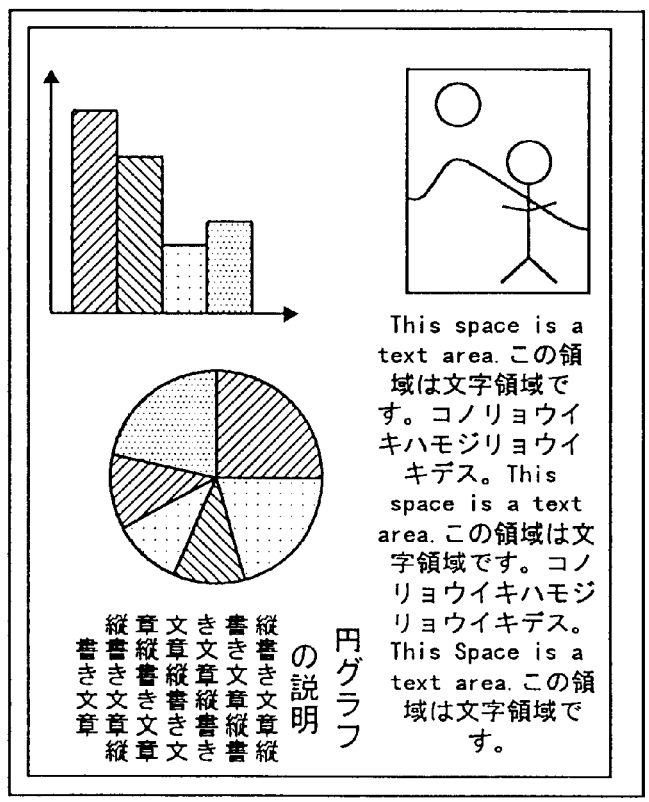
FIG. 6 shows an image obtained through combining of partial images in an image combining process.

In step S08, left image K and right image L are combined and the image combining process is completed. FIG. 6 shows an image obtained from the combining of partial images shown in FIG. 4 through the image combining process.

On the other hand, if the alignments are possible at step S04, the process goes to step S05 where the upper left partial image and the upper right partial image are combined and the lower left partial image and the lower right partial image are combined. Then at step S06, an upper image obtained from the combining of the upper left partial image and the upper right partial image and a lower image obtained from the combining of the lower left partial image and the lower right partial image are combined, thus the image combining process is completed.

As can be seen from the foregoing, in the digital camera according to this embodiment, even if two adjacent partial images among four partial images obtained from separate-pickup do not have a common feature point in their overlapping portions, if another combination of two partial images which lie next to each other in a different direction have a common feature point in their overlapping portions, all the four partial images can be combined.

In the embodiment as described above, partial images are obtained by dividing the original image into four portions, that is an upper left portion, an upper right portion, a lower left portion and a lower right portion, and performing a pickup. The method of separation is, however, not limited to the example described above and the present invention is applicable to the combining of any number of partial images such as nine partial images (3×3) as far as the number and the arrangement of partial images allow the change in the order of combining.

Modification of Image Combining Process

In the above described image combining process, four partial images can be combined through the modification of the combining order of the partial images even when common feature points do not exist in the overlapping portions. In the modification of the image combining process, the combining of two partial images, when common feature points do not exist in overlapping portions of two partial images, is allowed through the pickup of a new image.

Here, for the simplicity of the description, the combining of upper left partial image P and upper right partial image Q shown in (A) and (B) of FIG. 4 will be described as an example. With reference to FIG. 4, overlapping portion 150 of upper left partial image P and overlapping portion 151 of upper right partial image Q do not have a common feature point. In this case, a displacement between upper left partial image P and upper right partial image Q cannot be detected. Hence, a new image including portions of upper left partial image P and upper right partial image Q is picked up by CCD 104.

Figure 7:
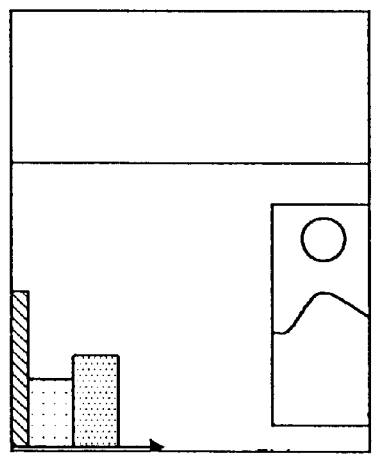
FIG. 7 shows a new image including portions of two adjacent images.

FIG. 7 shows an image A newly picked up by CCD 104. With reference to FIG. 7, newly picked-up image A includes a part of upper left partial image P and a part of upper right partial image Q. Thus, relative positions of upper left partial image P and upper right partial image Q with respect to the newly obtained image A can be detected, respectively. Thus, the alignment and combining of upper left partial image P and upper right partial image Q are allowed.

Figure 8:
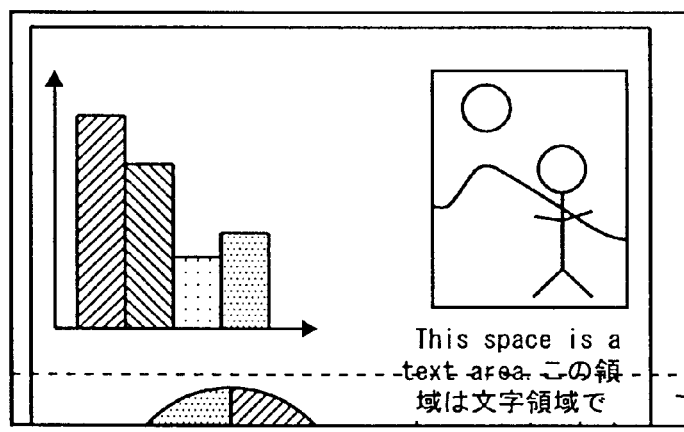
FIG. 8 shows an upper image M obtained by combining of an upper left partial image P and an upper right partial image Q, and a lower image N obtained by combining of a lower left partial image R and a lower right partial image S.
Figure 8:
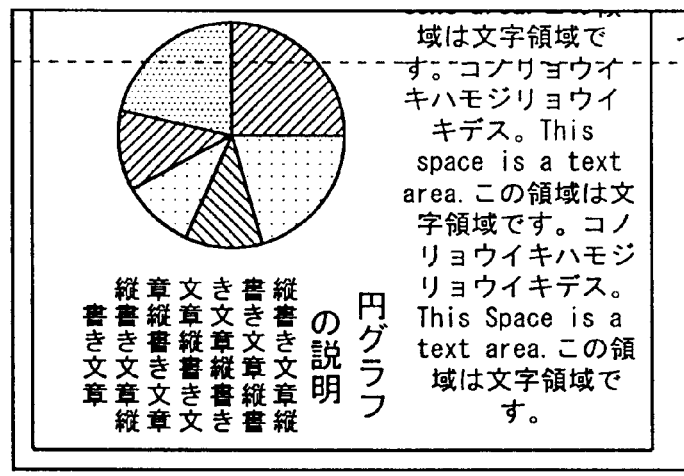

FIG. 8 shows an upper image M obtained from the combining of upper left partial image P and upper right partial image Q and a lower image N obtained from the combining of lower left partial image R and lower right partial image S. Through the modification of image combining process, upper left partial image P and upper right partial image Q are combined to form upper image M. As lower left partial image R and lower right partial image S have common feature points in respective overlapping portions 152 and 153, lower left partial image R and lower right partial image S are combined based on the feature point to form lower image N. Then, by combining upper image M and lower image N, an image shown in FIG. 6 is formed. As common feature points exist in overlapping portions 171 and 172, the pickup of a new image is not necessary when upper image M and lower image N are combined.

Figure 9:
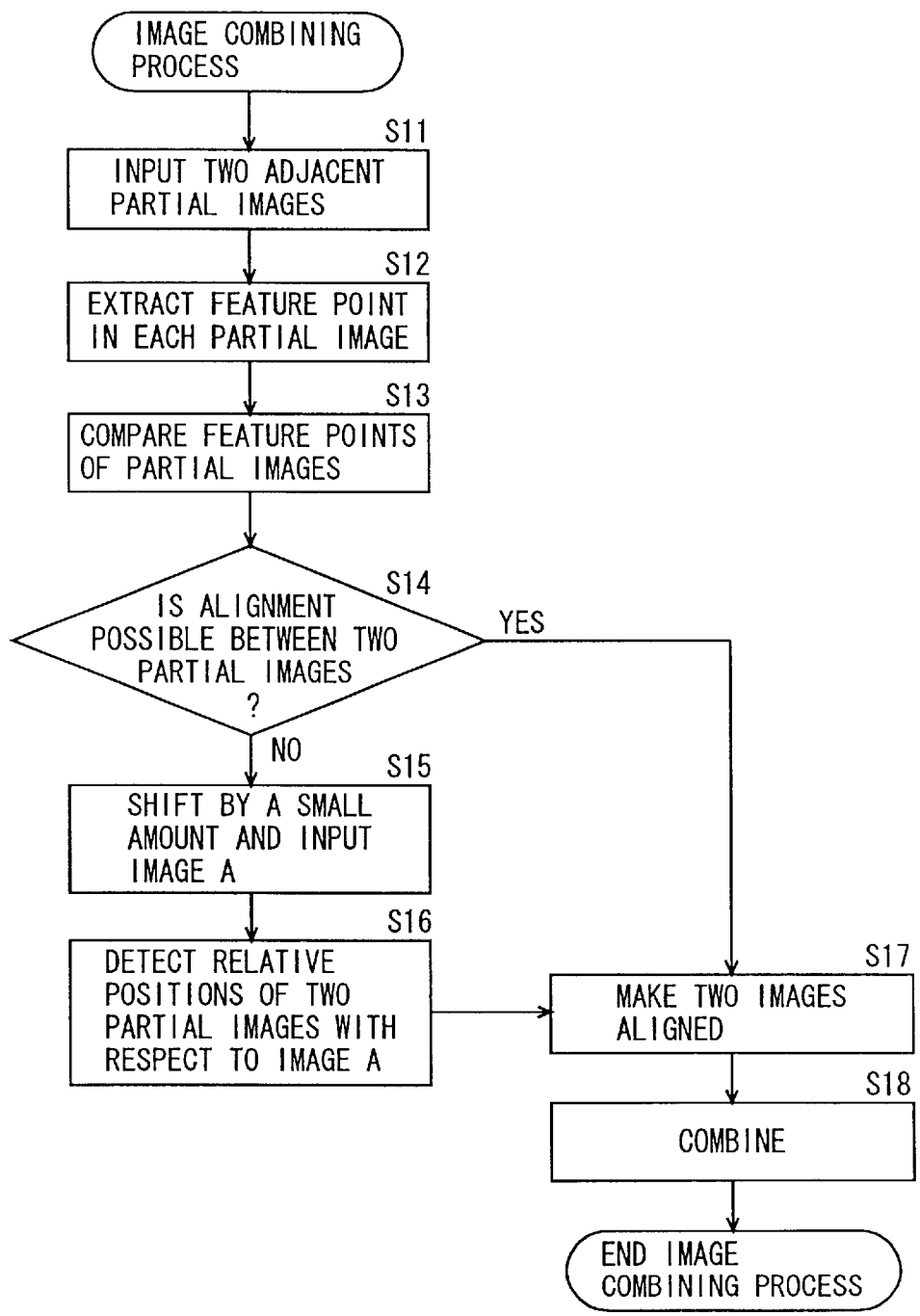
FIG. 9 is a flow chart showing a process flow of a modification of an image combining process.

FIG. 9 is a flow chart showing a process flow of the modification of the image combining process. With reference to FIG. 9, at step S11 two adjacent partial images are input. Then feature points are extracted from overlapping portions of respective input partial images (S12).

Then the extracted feature points are compared (S13) and it is determined whether the alignment of two partial images are possible or not (S14). When the alignment of two partial images is not possible (NO in S14), the position of CCD is shifted from the positions of the pickup of respective partial images and a resulting new image A is input (S15). The new image A includes portions of two adjacent partial images.

Then the relative positions of two adjacent partial images are detected (S16) with respect to image A which is input at step S15. Then, based on the detected relative positions, the alignment of two adjacent partial images is performed (S17) and the combining of two partial images is performed (S18).

On the other hand, when the alignment of two partial images is possible (YES in S14), the alignment of the images is directly performed (S17) and the combining of two partial images is performed (S18).

As can be seen from the foregoing, in the modification of the image combining process, two adjacent partial images can be correctly combined even when two adjacent partial images do not have common feature points in their overlapping portions, as a new image including parts of two partial images is newly picked up.

In addition, as an image including parts of two adjacent partial images is newly picked up, large overlapping portions of two adjacent partial images are not necessary. Thus, an area to be removed at the combining is reduced, resulting in the improvement of the resolution of an output image.

Here, when a new image including parts of two adjacent partial images is to be picked up, any portion of the original can be picked up as far as it contains parts of two respective partial images. In addition, a plurality of images can be picked up as far as the relation of relative positions of two adjacent images can be found. Further, the number of pixels of image A newly picked up does not need to be matched with that of two adjacent partial images. Hence, a different pickup element can be employed at the pickup of image A from the pickup element for the partial images.

Figure 10:
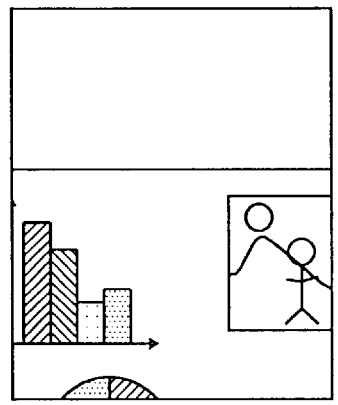
FIG. 10 shows an image including portions of an upper left partial image P and an upper right partial image Q obtained from pickup by a digital camera with different focal length.
Figure 11:
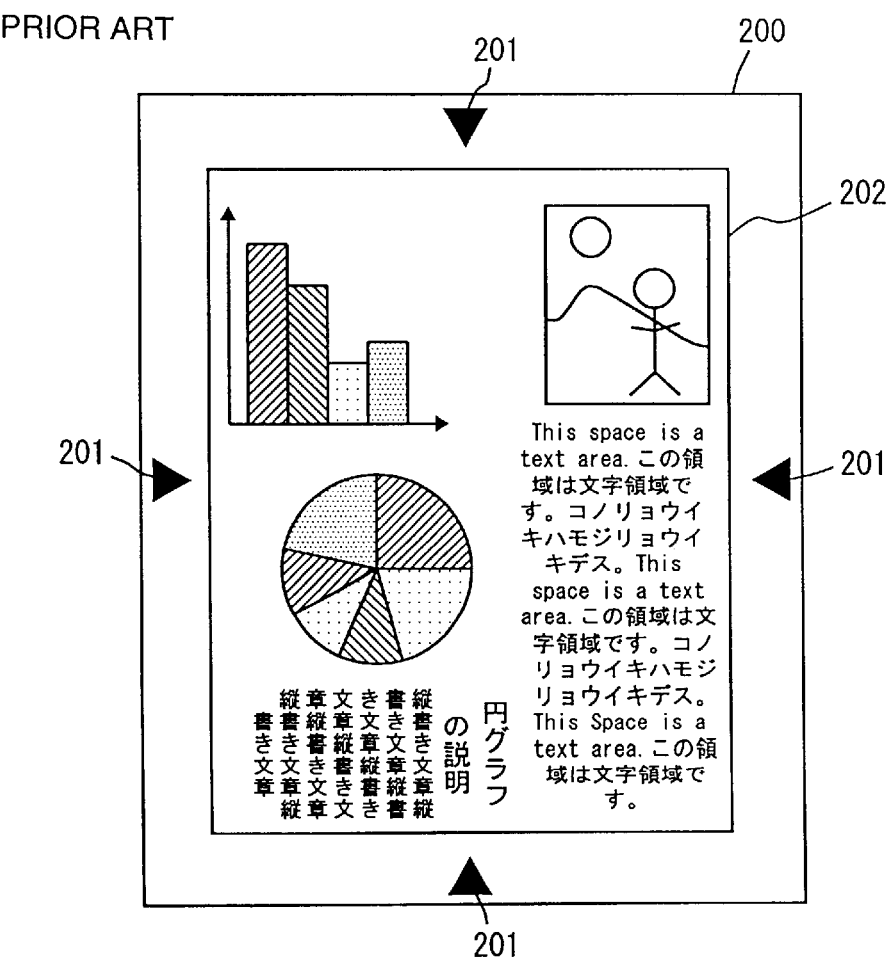
FIG. 11 shows a frame used in a conventional pickup device.
Figure 12:
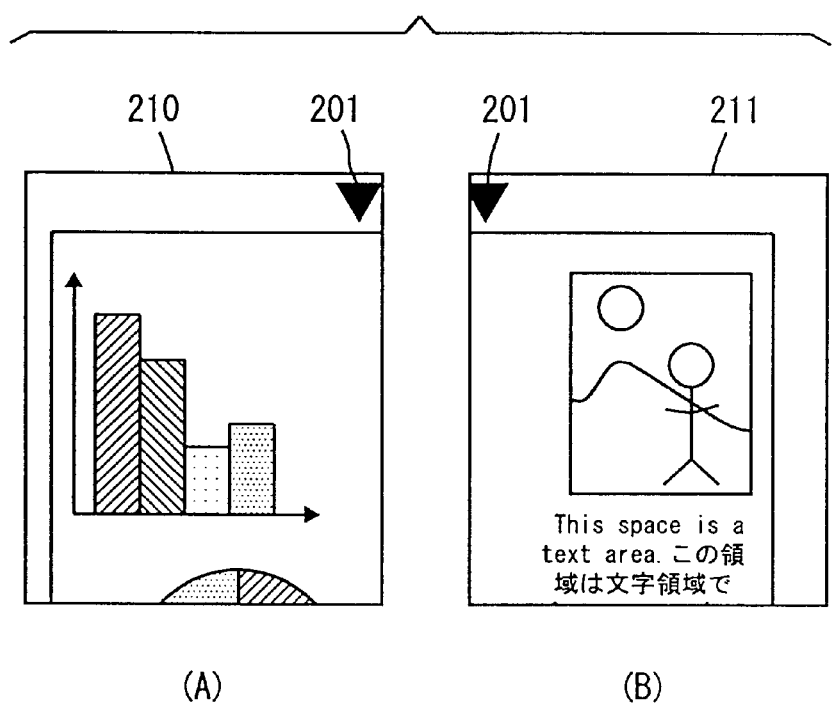
FIG. 12 shows partial images obtained from separate-pickup by a conventional pickup device.

Still further, the probability that common feature points exist in two adjacent partial images can be increased through the modification of focal length of the digital camera. FIG. 10 is an example of an image picked up with a different focal length. Compared with the image shown in FIG. 7, the image shown in FIG. 10 includes larger portions of upper left partial image P and upper right partial image Q. Hence, the relation of relative positions of upper left partial image P and upper right partial image Q can be found based on feature points in a larger area.

Though the digital camera according to this embodiment is configured such that the combining process is performed inside the digital camera, the combining process can also be performed outside the digital camera. For example, a set of partial images can be output from the digital camera and input to a personal computer, then the combining can be performed in the personal computer.

Though the digital camera has been described as an example in the embodiment, the present invention of course can be contemplated as a method for performing the processes shown in the flow charts of FIGS. 2 and 9 or as a computer program product causing a processor to perform these processes.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device comprising:
   an input section to input a plurality of images obtained from a separate-pickup of an object performed such that parts of the images are overlapped;
   a combining section to combine two images adjacent to each other in one of a first manner and a second manner;
   in said first manner, two images adjacent to each other in a first direction being combined based on overlapping regions of two images adjacent to each other in said first direction, and
   in said second manner, two images adjacent to each other in a second direction being combined based on overlapping regions of two images adjacent to each other in said second direction; and
   a controller to control said combining section according to a predetermined condition such that said combining section performs the combining in said first manner and then in said second manner when said two images adjacent to each other in the first direction can be combined and said two images adjacent to each other in the second direction can be combined, and performs the combining in said second manner and then in said first manner when at least one of said two images adjacent to each other in the first direction and said two images adjacent to each other in the second direction cannot be combined.

2. An image processing device comprising:
   an input section to input an image obtained from a separate-pickup of an object;
   a combining section to combine two adjacent images; and
   a controller to control said combining section (i) to combine said two adjacent images input through said input section when there are common feature points in overlapping regions of said adjacent images, and (ii) to input a new image through said input section and combine said two adjacent images based on said new image when there are no common feature points in overlapping regions of said adjacent images, said new image including image portions from both of said adjacent images.

3. An image processing method comprising:
   a receiving step of receiving a plurality of images obtained from a separate-pickup of an object performed such that parts of the images are overlapped;
   a first combining step of combining two images adjacent to each other in a first direction based on overlapping regions of two images adjacent to each other in said first direction; and
   a second combining step of combining two images adjacent to each other in a second direction based on overlapping regions of two images adjacent to each other in said second direction; wherein
   said first combining step is performed first and then said second combining step is performed when said plurality of images can be combined at said first combining step whereas said second combining step is performed first and then said first combining step is performed when said plurality of images cannot be combined at said first combining step.

4. An image processing method comprising:
   a first receiving step of receiving a plurality of images obtained from a separate-pickup of an object performed such that parts of images are overlapped;
   a first combining step of combining two adjacent images when there are common feature points in overlapping regions of said two adjacent images;
   a second receiving step of receiving a new image including image portions from both of said two adjacent images when said two adjacent images cannot be combined at said first combining step; and
   a second combining step of combining said two adjacent images based on the new image received at said second receiving step.

5. A computer program product embodied in a computer readable medium for causing a processor to perform:
   a receiving step of receiving a plurality of images obtained from a separate-pickup of an object performed such that parts of the images are overlapped;
   a first combining step of combining two images adjacent to each other in a first direction based on overlapping regions of two images adjacent to each other in said first direction; and a second combining step of combining two images adjacent to each other in a second direction based on overlapping regions of two images adjacent to each other in said second direction; wherein said first combining step is performed first and then said second combining step is performed when said plurality of images can be combined at said first combining step whereas said second combining step is performed first and then said first combining step is performed when said plurality of images cannot be combined at said first combining step.

6. A computer program product embodied in a computer readable medium for causing a processor to perform:

a first receiving step of receiving a plurality of images obtained from a separate-pickup of an object performed such that parts of images are overlapped;

a first combining step of combining two adjacent images when there are common feature points in overlapping regions of said two adjacent images;

a second receiving step of receiving a new image including image portions from both of said two adjacent images when said two adjacent images cannot be combined at said first combining step; and a second combining step of combining said two adjacent images based on the new image received at said second receiving step.

7. An image processing method of combining at least three images, comprising the steps of:

determining whether a first image and a second image can be combined based on an overlapping region or not, said overlapping region being a region in which said first and second images overlap;

deciding whether to first combine the first image and the second image or to first combine the second image and a third image based on a result of determination; and combining images based on said decision, wherein said step of combining includes the steps of:

combining the second image and the third image and combining the first image and a fourth image when combining of first and second images is determined to be impossible, and combining a resulting image from combining of the second image and the third image and a resulting image from combining of the first image and the fourth image.

8. A computer program product embodied in a computer readable medium to combine at least three images, causing a processor to perform the steps of:

determining whether a first image and a second image can be combined based on an overlapping region or not, said overlapping region being a region in which said first and second images overlap;

deciding whether to first combine the first image and the second image or to first combine the second image and a third image based on a result of determination; and combining images based on said decision, wherein said step of combining includes the steps of:

combining the second image and the third image and combining the first image and a fourth image when combining of first and second images is determined to be impossible, and combining a resulting image from combining of the second image and the third image and a resulting image from combining of the first image and the fourth image.

9. An image processing method of combining at least three images, comprising the steps of:

determining whether two images adjacent each other in a first direction can be combined with each other based on an overlapping region, said overlapping region being a region in which said two images overlap with each other, and whether another two images adjacent each other in a second direction can be combined with each other based on another overlapping region, said another overlapping region being a region in which said another two images overlap with each other;

deciding a first order of combining said at least three images when both said two images adjacent each other in said first direction and said another two images adjacent each other in said second direction can be combined, and deciding a second order of combining said at least three images when at least one of said two images adjacent each other in said first direction and said another two images adjacent each other in said second direction cannot be combined; and combining said at least three images based on either the decided first order or the decided second order.

10. A computer program product embodied in a computer readable medium to combine at least three images, causing a processor to perform the steps of:

determining whether two images adjacent each other in a first direction can be combined with each other based on an overlapping region, said overlapping region being a region in which said two images overlap with each other, and whether another two images adjacent each other in a second direction can be combined with each other based on another overlapping region, said another overlapping region being a region in which said another two images overlap with each other;

deciding a first order of combining said at least three images when both said two images adjacent each other in said first direction and said another two images adjacent each other in said second direction can be combined, and deciding a second order of combining said at least three images when at least one of said two images adjacent each other in said first direction and said another two images adjacent each other in said second direction cannot be combined; and combining said at least three images based on either the decided first order or the decided second order.

* * * * *